US012162292B2

(12) United States Patent
Goto et al.

(10) Patent No.: US 12,162,292 B2
(45) Date of Patent: Dec. 10, 2024

(54) RECORDING APPARATUS AND RECORDING METHOD

(71) Applicant: CANON KABUSHIKI KAISHA, Tokyo (JP)

(72) Inventors: Fumitaka Goto, Tokyo (JP); Tomokazu Ishikawa, Kanagawa (JP); Akitoshi Yamada, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 120 days.

(21) Appl. No.: 18/172,072

(22) Filed: Feb. 21, 2023

(65) Prior Publication Data

US 2023/0264486 A1 Aug. 24, 2023

(30) Foreign Application Priority Data

Feb. 22, 2022 (JP) ................................ 2022-025903

(51) Int. Cl.
*B41J 2/335* (2006.01)

(52) U.S. Cl.
CPC .................................... *B41J 2/335* (2013.01)

(58) Field of Classification Search
CPC ..... B41J 2/335; B41J 2/36; B41J 2/525; B41J 35/16; B41J 35/18; B41J 2002/0052; B41F 16/00; B41F 16/0006
See application file for complete search history.

(56) References Cited

U.S. PATENT DOCUMENTS 4,789,872 A * 12/1988 Hosoi ................ H04N 1/40031 347/175
2009/0309946 A1 12/2009 Saquib
2020/0016905 A1* 1/2020 Tsuchiya ................ B41J 2/3558

FOREIGN PATENT DOCUMENTS

JP 202141710 * 3/2021 .............. B41J 2/315
WO WO2021153682 * 8/2021 .............. B41J 2/355

* cited by examiner

*Primary Examiner* — Kristal Feggins
(74) *Attorney, Agent, or Firm* — Canon U.S.A., Inc., IP Division

(57) ABSTRACT

To prevent an insufficient development density of pixels with which a high-density image is recorded. Thermal energy to be applied to a pixel of interest is increased if a pixel immediately subsequent to the pixel of interest is one to which energy not causing heat propagation to the pixel of interest is applied.

17 Claims, 15 Drawing Sheets

RECORDING APPARATUS AND RECORDING METHOD

BACKGROUND

Technical Field

One disclosed aspect of the embodiments relates to a recording apparatus and a recording method.

Description of the Related Art

Monochrome printing using thermal paper and color printing using ink ribbons have heretofore been widely used for recording by a thermal print head. In recent years, color recording using a sheet including color developing layers of different colors has been discussed and become prevalent as easy-to-use means for printing pictures. The color developing layers of different colors have respective different heating temperatures and heating times for color development, and a color image is recorded by utilizing the differences to cause a specific color developing layer to develop color (United States Patent Application Publication No. 2009/0309946).

However, the technique discussed in United States Patent Application Publication No. 2009/0309946 may produce pixels of insufficient development density. Take, for example, a trailing portion of an area where color is developed in high density. If energy applied to pixels subsequent to the trailing portion is low, no heat propagates to the trailing portion from the pixels subsequent to the trailing portion. The trailing portion can thus have insufficient development density since the applied energy is lower than in the central part of the area where color is developed in high density.

SUMMARY

According to an aspect of the embodiments, a recording apparatus includes a recording head, a first conditional determination unit or circuit, and a pulse control unit or circuit. The recording head includes a plurality of heating elements arranged in a predetermined direction. The recording head is configured to heat a sheet-like recording medium based on image data to form an image on the recording medium by causing a desired color developing layer to develop color among a plurality of color developing layers stacked in the recording medium. The plurality of color developing layers corresponds to a plurality of colors and is configured to develop color in response to heating. The first conditional determination unit is configured to determine whether a first condition is satisfied. The first condition is that an immediately subsequent pixel that is located at a same position as a pixel of interest in the predetermined direction and is to be recorded next to the pixel of interest be either a pixel that develops color of which an effect on color development of the pixel of interest is not visually identifiable or a pixel that does not develop color of any of the color developing layers of the recording medium. The pulse control unit is configured to control a pulse to be applied to the recording head in forming the pixel of interest based on a result of determination made by the first conditional determination unit. The pulse control unit is configured to control, in a case where the pixel of interest of the image data has a predetermined value and the first condition is satisfied, the pulse to increase thermal energy for the recording head to apply to the recording medium in forming the pixel of interest as compared to a case where the pixel of interest of the image data has the predetermined value and the first condition is not satisfied.

Further features of the disclosure will become apparent from the following description of exemplary embodiments with reference to the attached drawings.

BRIEF DESCRIPTION OF THE DRAWINGS

FIGS. 10-0 to 10-5 are diagrams illustrating image formation according to the first exemplary embodiment.

FIGS. 11-0A to 11-2 are diagrams illustrating pulse control according to the first exemplary embodiment.

FIGS. 14-0A to 14-1 are diagrams illustrating pulse control according to a second exemplary embodiment.

DESCRIPTION OF THE EMBODIMENTS

Exemplary embodiments will be specifically described in detail below with reference to the attached drawings. The following exemplary embodiments are not intended to limit the disclosure set forth in the claims. While the exemplary embodiments describe a plurality of features, all such features are not necessarily indispensable to the disclosure, and the features may be freely combined. In the attached drawings, the same or similar configurations are denoted by the same reference numbers. A redundant description thereof will be omitted. In the following, the term “unit” may refer to a software context, a hardware context, or a combination of software and hardware contexts. In the software context, the term “unit” refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term “unit” refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

<Overview of Recording Apparatus (FIGS. 1 to 3)>

Figure 1:
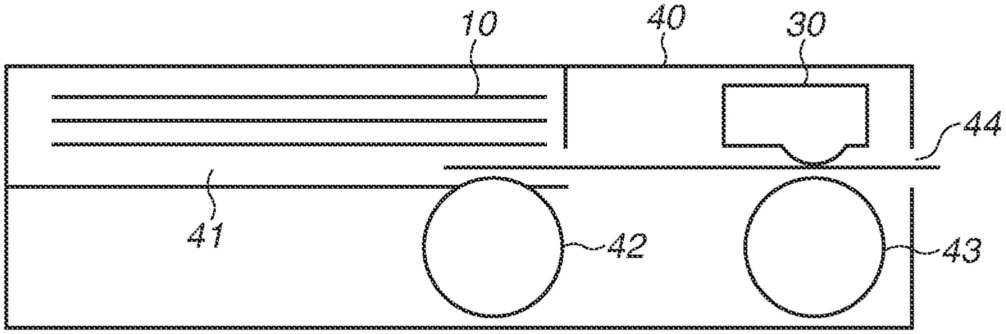
FIG. 1 is a diagram illustrating an overall configuration of a recording apparatus.

A first exemplary embodiment will be described below. FIG. 1 is a sectional side view illustrating a schematic configuration of a recording apparatus that is a representative exemplary embodiment.

As illustrated in FIG. 1, a recording apparatus 40 includes a recording head 30, a storage unit or circuit 41, a conveyance roller 42, a platen 43, and a discharge port 44. The storage unit 41 can store a plurality of sheet-like recording media 10, and can be replenished with recording media 10 by a cover (not illustrated) being opening and closed. During printing, a recording medium 10 is conveyed to a portion under the recording head 30 by the conveyance roller 42. After an image is formed on the recording medium 10 between the platen 43 and the recording head 30, the recording medium 10 is discharged from the discharge port 44 to complete printing.

Figure 2:
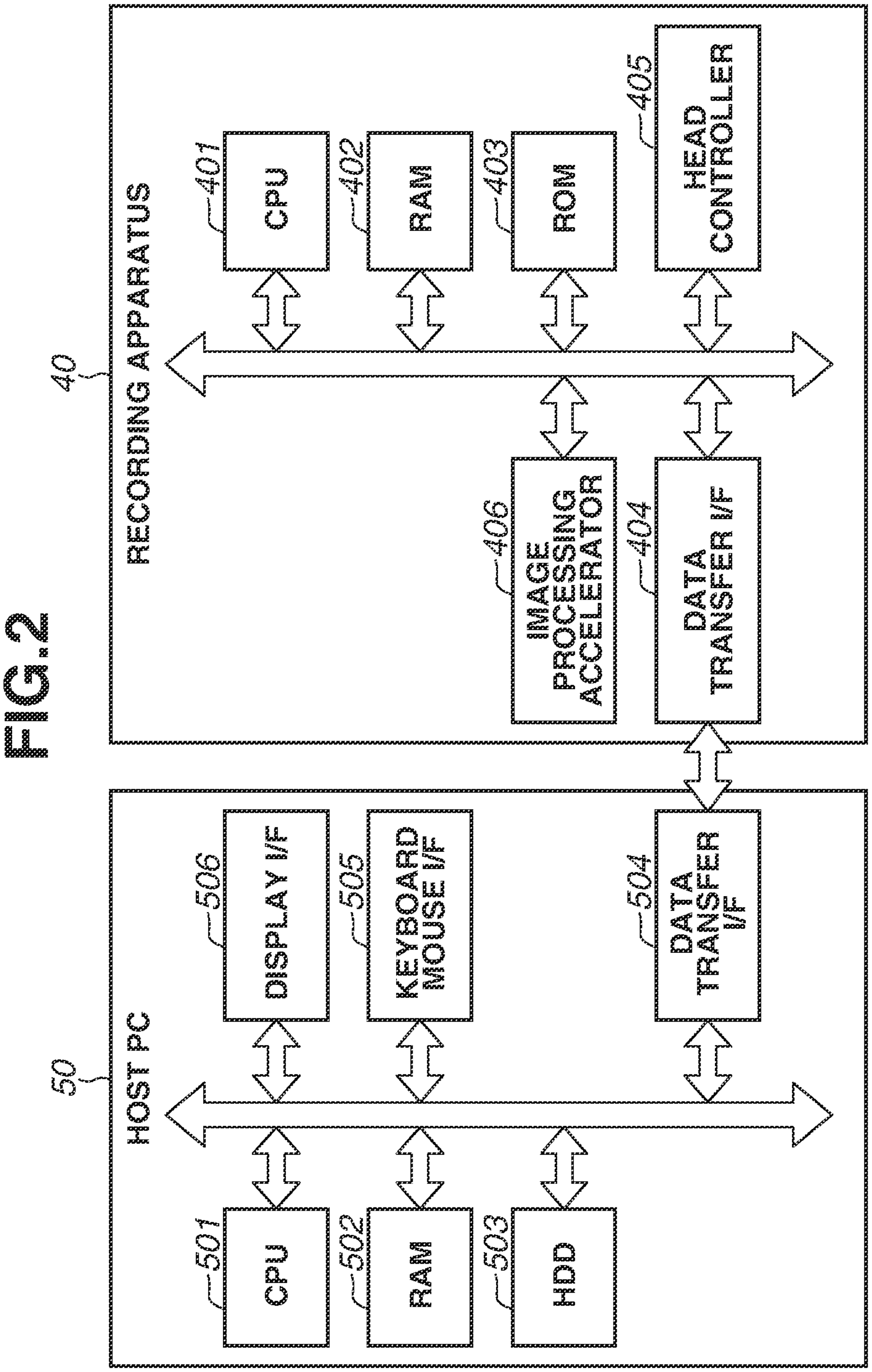
FIG. 2 is a diagram illustrating a control configuration of a recording system.

FIG. 2 is a block diagram illustrating a control configuration of a recording system including the recording apparatus 40 illustrated in FIG. 1 and a host apparatus connected thereto. As illustrated in FIG. 2, this recording system includes the recording apparatus 40 illustrated in FIG. 1 and a personal computer (host personal computer [PC]) 50 serving as the host apparatus.

The host PC 50 includes a central processing unit (CPU) 501, a random access memory (RAM) 502, a hard disk drive (HDD) 503, a data transfer interface (I/F) 504, a keyboard mouse I/F 505, and a display I/F 506.

The CPU 501 performs processing based on programs stored in the HDD 503 and the RAM 502. The RAM 502 is a volatile storage, and temporarily stores programs and data. The HDD 503 is a nonvolatile storage, and also stores programs and data. The data transfer I/F 504 controls data transmission and reception to/from the recording apparatus 40. Examples of the data transmission and reception method include wired connections, such as Universal Serial Bus (USB), the Institute of Electrical and Electronics Engineers (IEEE) 1394, and a local area network (LAN), and wireless connections, such as Bluetooth® and Wireless Fidelity (Wi-Fi). The keyboard mouse I/F 505 is an I/F for controlling a user interface (UI) with a keyboard and a mouse. The user can input information into the host PC 50 via the keyboard mouse I/F 505. The display I/F 506 controls display of a display device (not illustrated).

The recording apparatus 40 includes a CPU 401, a RAM 402, a ROM 403, a data transfer I/F 404, a head controller 405, and an image processing accelerator 406.

The CPU 401 performs processing according to exemplary embodiments to be described below based on programs stored in the ROM 403 and the RAM 402. The RAM 402 is a volatile storage, and temporarily stores programs and data. The ROM 403 is a nonvolatile storage, and stores table data and programs to be used in the processing of the exemplary embodiments to be described below. The data transfer I/F 404 controls data transmission and reception to/from the host PC 50.

The head controller 405 controls a heating operation (to be described below) on the recording head 30 based on recording data. More specifically, the head controller 405 is configured to read control parameters and recording data from a predetermined address of the RAM 402. In response to the CPU 401 writing the control parameters and the recording data at the predetermined address of the RAM 402, the head controller 405 activates processing and performs a heating operation on the recording head 30.

The image processing accelerator 406 is a hardware configuration that performs image processing faster than the CPU 401. More specifically, the image processing accelerator 406 is configured to read parameters and data to be used for the image processing from a predetermined address of the RAM 402. When the CPU 401 writes the parameters and data at the predetermined address of the RAM 402, the image processing accelerator 406 is activated to perform predetermined image processing.

The image processing accelerator 406 is not necessarily an essential component. Depending on the specifications of the recording apparatus 40, the processing for generating the foregoing table parameters and the image processing may be executed through the processing of the CPU 401 alone.

<Overview of Configuration of Recording Head (FIG. 3)>

Figure 3:
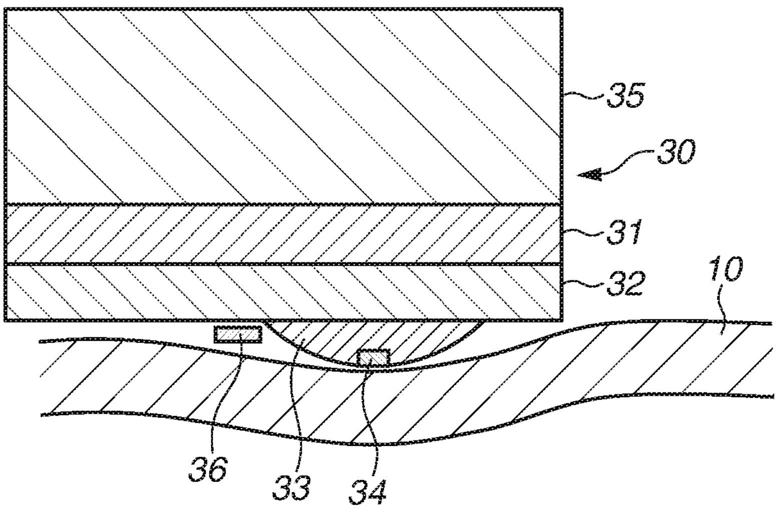
FIG. 3 is a diagram illustrating a configuration of a recording head and a recording medium during recording.

FIG. 3 is a sectional side view illustrating a configuration of the recording head 30 and the state of a contact area between the recording head 30 and the recording medium 10.

The recording head 30 includes a glazed layer 32 on a substrate 31. A convex glazed layer 33 may be further disposed on the glazed layer 32. If there is a convex glazed layer 33, a resistor 34 is disposed at the surface of the convex glazed layer 33. If not, the resistor 34 is disposed at the surface of the flat glazed layer 32. A protective film layer is desirably formed over the resistor 34, the glazed layer 32, and the convex glazed layer 33. The combination of the glazed layer 32 and the convex glazed layer 33, which are typically made of the same material, will hereinafter be referred to as a "glazed layer of the recording head 30". A thermistor 36 is located on the glazed layer 32 near the resistor 34.

The substrate 31 is in contact with a heat sink 35, and cooled by using a fan. The recording medium 10 makes contact with the glazed layer of the recording head 30, which typically has a length substantially greater than that of an actual heating resistor. The resistor 34 is an electrothermal transducer (heater or heating element) that generates heat when an electric current is supplied thereto. If the resistor 34 generates heat, the resistance of the thermistor 36 located nearby changes and the temperature near the thermistor 36 can be estimated. The temperature of the resistor 34 corresponding to the surface of the recording head 30 is unable to be directly measured using the thermistor 36. Thus, the temperature at the surface of the recording head 30 can be estimated by associating temperatures near the thermistor 36 with the corresponding temperatures at the surface of the recording head 30 by experiment in advance. The resistor 34 typically has a length of approximately 120 μm or so in the conveyance direction of the recording medium 10. The thermal contact area between the glazed layer of the recording head 30 and the recording medium 10 is typically 200 μm or more.

<Overview of Recording Principle (FIGS. 4 and 5)>

Figure 4:
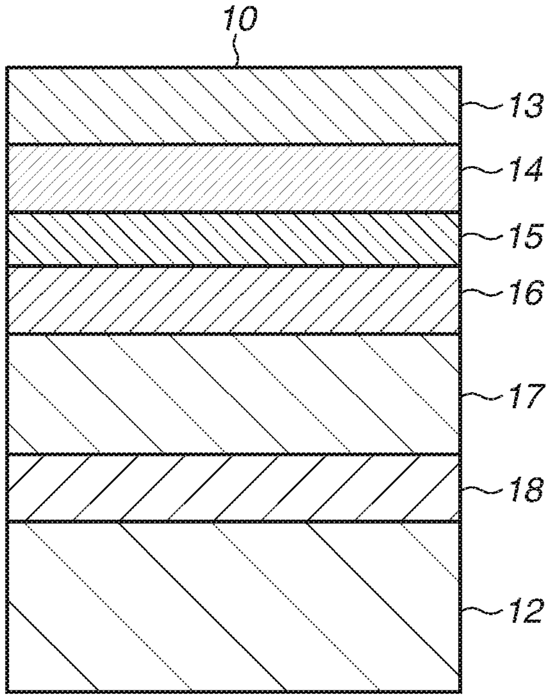
FIG. 4 is a diagram illustrating a layer structure of the recording medium.

FIG. 4 is a sectional view illustrating a structure of the sheet-like recording medium 10 to be used for image formation using infrared rays as a heat source. As will be described in detail below, the recording medium 10 includes a stack of color developing layers of different colors. The color developing layers develop color when heated by heat rays (infrared rays) radiated by the resistor 34 being supplied with a current. The recording medium 10 is also referred to as an infrared image member since a full color image is formed by the development of colors by the color developing layers. In this sense, the recording medium 10 will hereinafter be referred to as an infrared image member 10.

As illustrated in FIG. 4, the infrared image member 10 includes image forming layers 14, 16, and 18, spacer layers 15 and 17, and a protective film layer 13 on a light-reflecting base 12. The image forming layers 14, 16, and 18 typically develop yellow (Y), magenta (M), and cyan (C) for full color printing. However, different color combinations may be employed.

Each image forming layer is initially colorless, and develops color when heated to a specific temperature called activation temperature. The color order of the image forming layers 14, 16, and 18 are freely selectable. A suitable color order of the image forming layers 14, 16, and 18 is as described above. Another suitable color order is such that the three image forming layers 14, 16, and 18 are C, M, and Y. Here, an example where the image forming layers 14, 16, and 18 are configured in the foregoing order of Y, M, and C will be described.

The spacer layer 15 is desirably thinner than the spacer layer 17. This does not necessarily apply if the member including the two layers has substantially the same thermal diffusivities. A function of the spacer layers 15 and 17 is to control thermal diffusion in the infrared image member 10. If the spacer layer 17 is made of the same material as that of the spacer layer 15, the spacer layer 17 is desirably at least four times as thick as the spacer layer 15. Before image formation, all the layers on the base 12 are substantially transparent. If the base 12 is in reflective color (such as white), the color image formed in the infrared image member 10 is viewed through the protective film layer 13 on the reflective background provided by the base 12. Since the layers on the base 12 are transparent, the combination of colors formed in the respective image forming layers can be seen.

The three image forming layers 14, 16, and 18 of the infrared image member 10 are located on the same side of the base 12. However, some of the image forming layers 14, 16, and 18 may be located on the other side of the base 12.

The image forming layers 14, 16, and 18 are processed independently at least in part, by changing two adjustable parameters, namely, temperature and time. Images can be formed in desired image forming layers by selecting the temperature of the recording head 30 and the time period when the infrared image member 10 is heated.

Each of the image forming layers 14, 16, and 18 is processed by the recording head 30 generating heat in contact with the topmost layer of the infrared image member 10, that is, the protective film layer 13 of the infrared image member 10. The image forming layer 14 (the third image forming layer from the base 12, and the image forming layer closest to the surface of the infrared image member 10) has an activation temperature (Ta3) higher than that (Ta2) of the image forming layer 16 and also higher than that (Ta1) of the image forming layer 18.

Image forming layers at greater distances from the recording head 30 are heated with a delay as much as a heating time for heat to diffuse to the layers through the spacer layers. Such a heating delay prevents image forming layers that are substantially higher in the activation temperature and closer to the recording head 30 than the image forming layers having lower activation temperatures (image forming layers farther from the recording head 30) from activating the underlying image forming layers. This enables heating beyond the activation temperatures. In processing the topmost image forming layer 14, the recording head 30 is therefore heated to a relatively high temperature for a short time so that both the image forming layers 16 and 18 are insufficiently heated and prevented from activation.

To activate only an image forming layer closer to the base 12 (here, the image forming layer 16 or 18), the infrared image member 10 is heated at a temperature lower than the activation temperature(s) of the image forming layer(s) farther from the base 12 for a sufficiently long period. If the image forming layer having the lower activation temperature is thus activated, the image forming layer(s) having the higher activation temperature(s) is/are prevented from activation.

While the infrared image member 10 is desirably heated using the recording head 30, other methods for applying controlled heat to the infrared image member 10 may be used. For example, some kind of known means, such as a modulated light source (e.g., laser light source), may be used.

Figure 5:
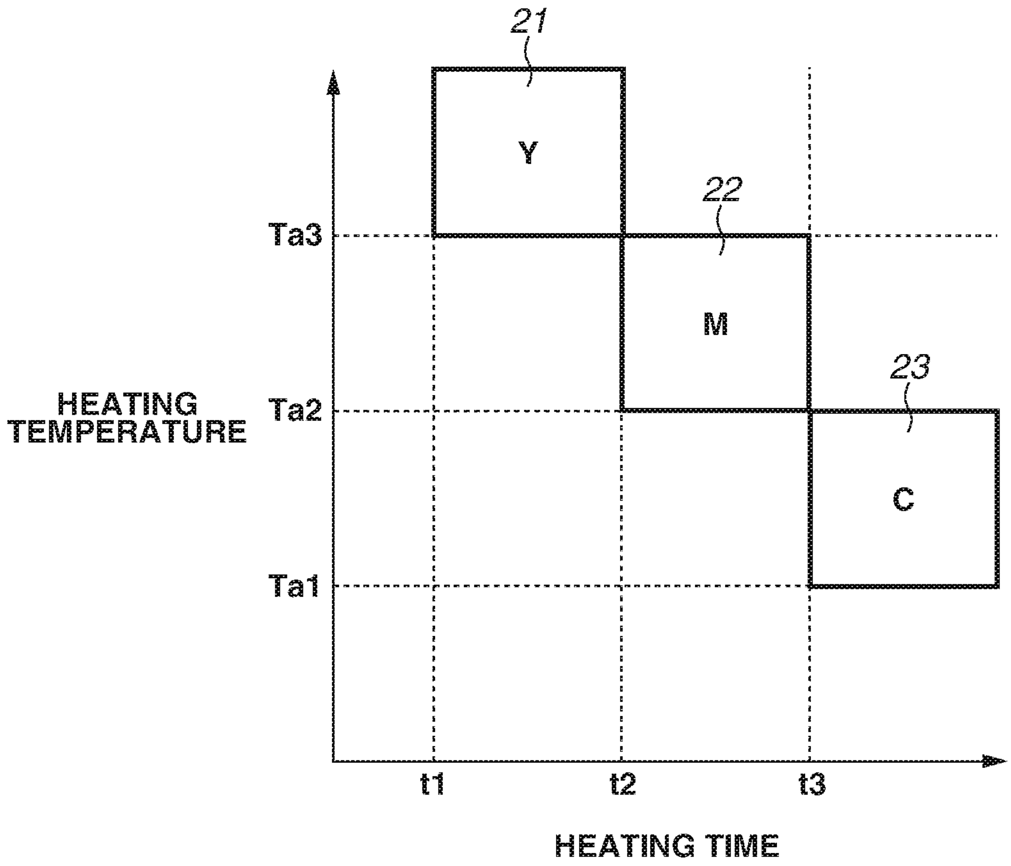
FIG. 5 is a diagram illustrating heating times and heating temperatures for developing the colors of respective image forming layers of the recording medium.

FIG. 5 is a diagram for describing the heating temperature and time of the recording head 30 in processing the three image forming layers 14, 16, and 18 illustrated in FIG. 4.

In FIG. 5, the vertical axis indicates the heating temperature at the surface of the infrared imaging member 10 in contact with the recording head 30. The horizontal axis indicates the heating time. An area 21 (where the temperature of the recording head 30 is relatively high and the heating time is relatively short) implements the imaging of the image forming layer 14. An area 22 (where the temperature of the recording head 30 is intermediate and the heating time is intermediate) implements the imaging of the image forming layer 16. An area 23 (where the temperature of the recording head 30 is relatively low and the heating time is relatively long) implements the imaging of the image forming layer 18. The time for the imaging of the image forming layer 18 is substantially longer than that for the imaging of the image forming layer 14.

The activation temperatures selected for the image forming layers 14, 16, and 18 are typically in the range of approximately 90° C. to approximately 300° C. The activation temperature Ta1 of the image forming layer 18 is desirably as consistently low as possible in view of the thermal stability of the infrared imaging member 10 at shipment and during storage. The activation temperature Ta1 is suitably approximately 100° C. or higher. For the activation temperature Ta3, in order to heat the other image forming layers, which are the image forming layers 16 and 18, via the image forming layer 14 for activation and color-development without activation of the image forming layer 14 by the heating method according to the present exemplary embodiment, the image forming layer 14 desirably has a consistently low activation level as compared with the image forming layers 16 and 18. In other words, the temperature (Ta3) at which the image forming layer 14 is activated to develop color is desirably high. The activation temperature T3*a* is suitably approximately 200° C. or higher. The activation temperature Ta2 of the image forming layer 16 satisfies Ta1<Ta2<Ta3. The activation temperature Ta2 is suitably between approximately 140° C. and approximately 180° C.

The recording head 30 used here includes a resistor array including a plurality of resistors linearly arranged to extend substantially over an entire image width (in a direction orthogonal to the conveyance direction of the infrared image member 10).

The recording width of the recording head 30 may be smaller than the image width. In such a case, however, the recording head 30 is configured to be moved with respect to the infrared image member 10 or used in combination with another recording head so that the image is processed across the entire width.

Currents are fed through the resistors to provide heating pulses for imaging while the infrared image member 10 is being conveyed in the direction orthogonal to that in which the resistors of the recording head 30 are arranged. The recording head 30 typically heats the infrared image member 10 for a time in the range of approximately 0.001 to approximately 100 milliseconds per line of the image. The upper limit is rationally set in view of an image printing time. The lower limit is defined by limitations of the electronic circuits.

The dot pitch of the formed image is typically in the range of 100 to 600 lines per inch in both the conveyance direction of the infrared image member 10 and the direction perpendicular thereto. The dot pitch may vary depending on the direction.

The recording apparatus 40 described above is a type of thermal printer. The recording apparatus 40 uses a recording method called Zero Ink (ZINK) method or Zero Ink technology (registered trademark).

<Flowchart of Recording System>

Figure 6:
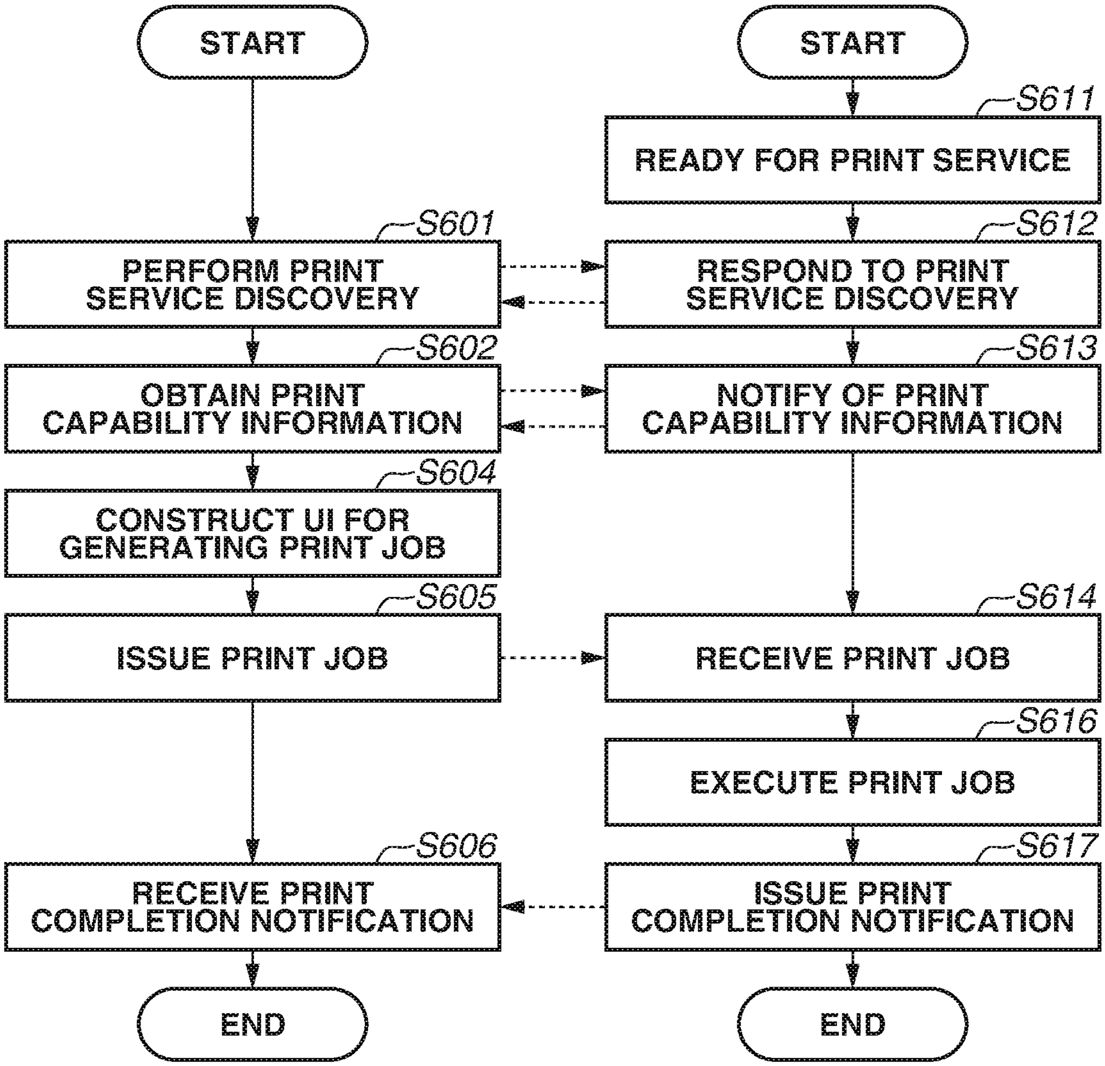
FIG. 6 is a flowchart illustrating processing by the recording apparatus and a host personal computer (PC) in performing a print service.

FIG. 6 is a flowchart illustrating processing by the recording apparatus 40 and the host PC 50 when the recording system described above performs a conventional print service. In FIG. 6, steps S601, S602, and S604 to S606 illustrate the processing to be performed by the host PC 50. Steps S611 to S614, S616, and S617 illustrate the processing to be performed by the recording apparatus 40. As illustrated in FIG. 6, when the user wants to print, the host PC 50 starts processing and the recording apparatus 40 starts processing in response. In step S611, the recording apparatus 40 checks that the recording apparatus 40 itself is ready for printing, and starts the print service and enters a print preparation completed state (becomes ready for the print service).

In such a state, in step S601, the host PC 50 performs a print service discovery. In step S612, the recording apparatus 40 responds to the discovery and notifies the host PC 50 that the recording apparatus 40 can provide the print service. In step S602, the host PC 50 obtains print capability information. Basically, the host PC 50 requests print capability information from the recording apparatus 40. In step S613, the recording apparatus 40 notifies the host PC 50 of information about the print service that the recording apparatus 40 can provide.

In step S604, the host PC 50 constructs a UI for generating a print job based on the notified print capability information. More specifically, the host PC 50 displays appropriate options, such as print sizes and printable sheet sizes, on the display device and thereby provides the appropriate options for the user based on the print capability information about the recording apparatus 40. In step S605, the host PC 50 issues a print job.

In step S614, the recording apparatus 40 receives the print job. In step S616, the recording apparatus 40 executes the print job. If the recording apparatus 40 completes printing based on the print job, then in step S617, the recording apparatus 40 notifies the host PC 50 of the completion of the printing (issues a print completion notification). In step S606, the host PC 50 receives the print completion notification, and notifies the user of the completion of the printing.

With the print job completed, the host PC 50 and the recording apparatus 40 complete the respective series of print service processes.

In the foregoing description, various pieces of information are all described to be communicated by the host PC 50 issuing a request to the recording apparatus 40 and the recording apparatus 40 responding to the request. However, the communication between the host PC 50 and the recording apparatus 40 is not limited to pull communication. Push communication where the recording apparatus 40 spontaneously transmits information to the host PC 50 (and other host PCs) on the network may be employed.

<Pulses Applied to Recording Head>

Figure 7:
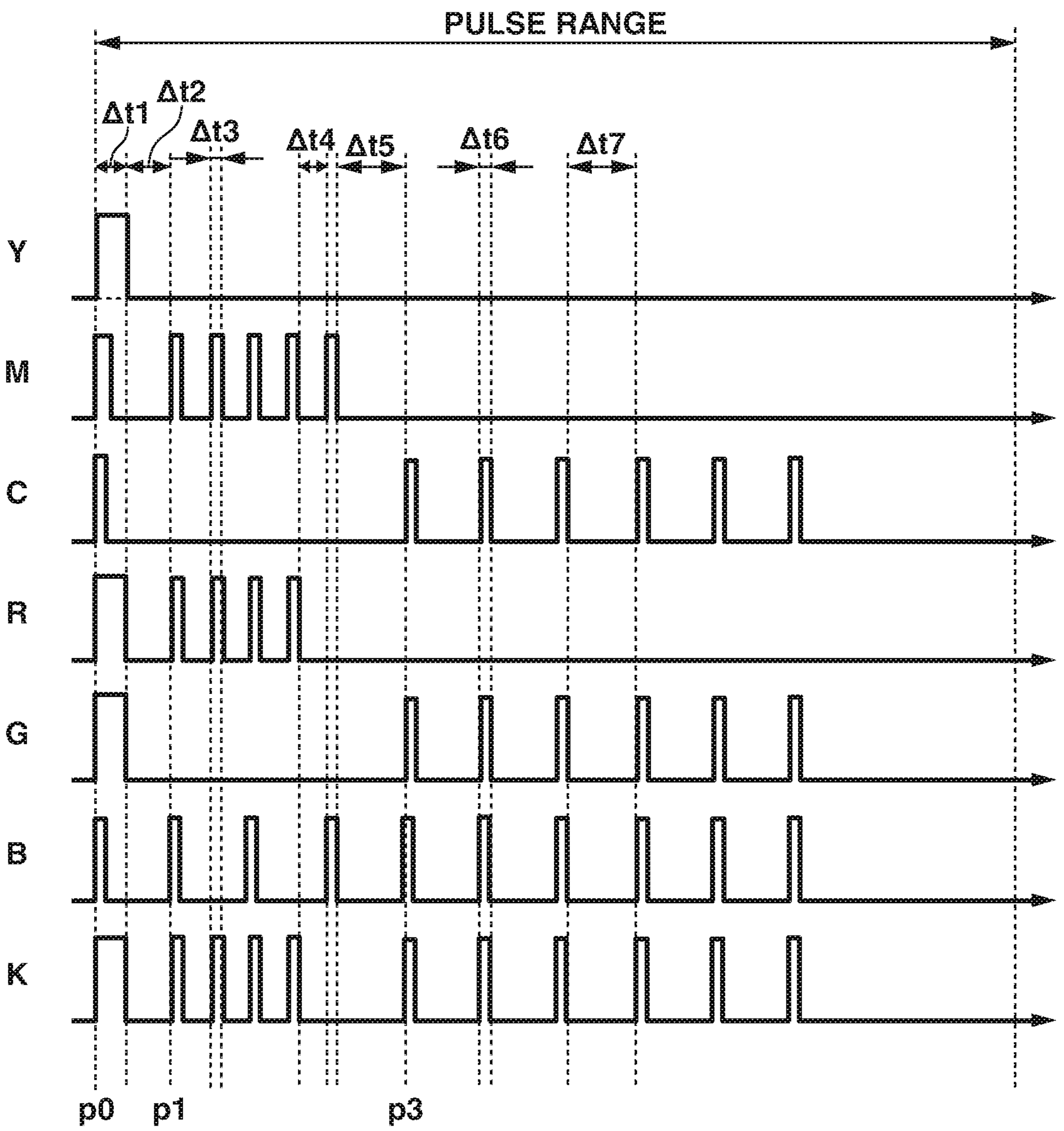
FIG. 7 is a diagram illustrating pulses to develop colors.

FIG. 7 is a diagram illustrating examples of heating pulses applied to the recording head 30 of the recording apparatus 40. In FIG. 7, timing p0 is the earliest in time. The time elapses from the left to right on the time axis.

Colors to be developed are listed to the left of FIG. 7. Corresponding heating pulses are illustrated to the right. For example, in the case of developing Y, heating for a time Δt1 is performed once at timing p0 to implement the heating temperature and heating time of the area 21 in FIG. 5. In the case of developing M, to implement the heating temperature and heating time of the area 22 in FIG. 5, heating for a shorter time than Δt1 is initially performed once at timing p0. This heating is intended for preheating, and no color is thereby developed. Heating for a time Δt3 is performed a total of five times starting at timing p1 after a lapse of Δt1+Δt2 since timing p0, with intervals of Δt4. In the case of developing C, to implement the heating temperature and heating time of the area 23 in FIG. 5, heating for a shorter time than Δt1 is initially performed once at timing p0. This initial heating time may be even shorter than that for M. This heating is intended for preheating, and no color is thereby developed. Heating for a time Δt6 is performed a total of six times starting at timing p3 after a lapse of Δt1+Δt2+((Δt3+Δt4)×4+Δt3)+Δt5 since timing p0, with intervals of Δt7.

The heating times of the image forming layers 14, 16, and 18 are as follows:

the heating time of Y=Δt1, the heating time of M=Δt3×4+Δt3, and the heating time of C=Δt6×5+Δt6.

The heating times of the image forming layers 14, 16, and 18 have the following relationship:

the heating time of Y<the heating time of M<the heating time of C, where Y, M, and C represent the image forming layers 14, 16, and 18, respectively.

The amount of heat applied by the recording head 30 decreases due to heat conduction to the glazed layer 32, the substrate 31, and the heat sink 35 of the recording head 30 while the infrared image member 10 is not heated, such as the pulse intervals Δt2, Δt4, Δt5, and Δt7, and the temperature of the infrared image member 10 thus drops. The amount of heat applied to the infrared image member 10 also decreases due to heat conduction to the platen 43, and the temperature of the infrared image member 10 drops accordingly. If the same amount of heat is applied at the same temperature, the temperature drops more as the intervals increases. Using the heating times and the heating intervals, the peak temperatures in developing the colors of the respective image forming layers 14, 16, and 18 alone are set to satisfy the following relationship:

the peak temperature of Y>Ta3,

Ta3>the peak temperature of M>Ta2, and

Ta2>the peak temperature of C>Ta1.

Y, M, and C colors can be independently developed by such control.

Next, heating pulses for controlling the development of secondary colors red (R), green (G), and blue (B), and a tertiary color black (K) will be described.

In FIG. 7, red is developed by controlling heating pulses to develop Y and M in this order. Similarly, in FIG. 7, green is developed by controlling heating pulses to develop Y and C in this order. In FIG. 7, blue is developed by controlling heating pulses to develop M and C in this order. In FIG. 7, K is developed by controlling heating pulses to develop Y, M, and C in this order.

In the case of developing red, the heating pulse for developing Y is the same as that for singly developing Y, that is, a heating pulse for the time Δt1. However, the heating pulses for developing M are one fewer than those for singly developing M. The reason for the fewer heating pulses is to prevent the image forming layer of C from reaching its color developing temperature. In the case of developing green, heating pulses obtained by ORing the heating pulse for singly developing Y and those for singly developing C are used. The development of M is prevented by lowering the temperature inside the recording medium 10 between the heating pulse for developing Y and those for developing C. In the case of developing blue, a heating pulse for the time Δt6 is applied a total of ten times starting at timing p0, with intervals of Δt7. The greater number of heating pulses than for singly developing C makes the image forming layer of M reach its color developing temperature as well. In the case of developing K, heating pulses obtained by ORing those for developing red and those for singly developing C are applied.

Figures 8A, 8B, 8C, 8D, 8E, 8F, 8G, 8H:
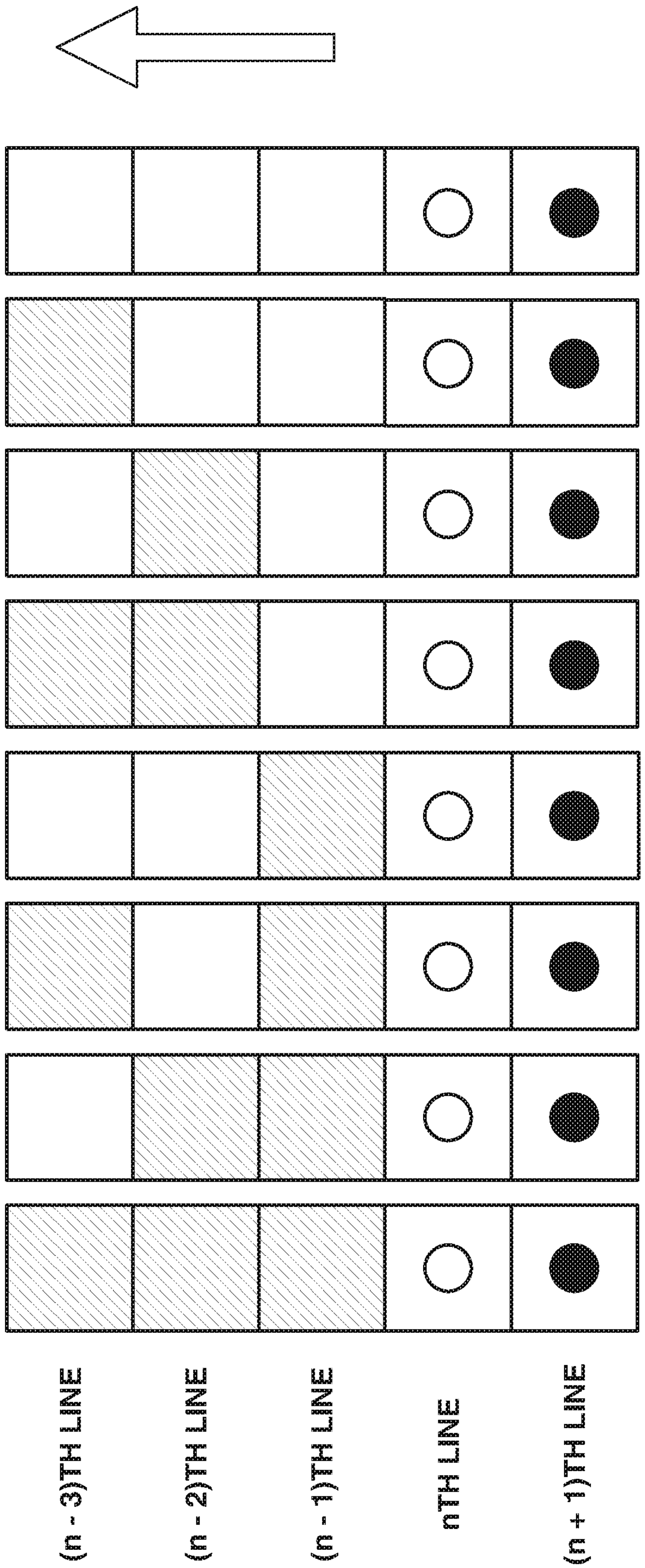
FIGS. 8A to 8H are diagrams illustrating pixels to be referred to and pixel patterns according to a first exemplary embodiment.

FIGS. 8A to 8H are diagrams for describing pixels to be referred to in controlling heating pulses according to the present exemplary embodiment. The arrow indicates the conveyance direction of the recording medium 10. FIGS. 8A to 8H each illustrate a pixel of interest, three pixels immediately preceding the pixel of interest, and a pixel immediately subsequent to the pixel of interest in the conveyance direction. The pixel of interest is marked with ○, and the immediately subsequent pixel is marked with ●. Among the three immediately preceding pixels, a shaded pixel or pixels represent ones developing red. In other words, FIGS. 8A to 8H illustrate red development patterns of the three pixels. The pixels at the point side of the arrow (top in the diagram) are ones to be recorded first. In FIG. 8A, all the three pixels develop color, and the temperatures of the recording head 30 and the recording medium 10 immediately before a start of recording of the pixel of interest are the highest in FIGS. 8A to 8H. In FIG. 8H, none of the three pixels develops color, and the temperatures of the recording head 30 and the recording medium 10 immediately before a start of recording of the pixel of interest are the lowest in FIGS. 8A to 8H. The closer to the pixel of interest the red-developing pixel(s) is/are, the higher the temperatures of the recording head 30 and the recording medium 10 immediately before a start of recording of the pixel of interest. In other words, the temperatures of the recording head 30 and the recording medium 10 descend in order of FIGS. 8A to 8H. The temperature of the recording head 30 or the recording medium 10 due to the heating pulses applied to the pixels preceding the pixel of interest will be referred to as thermal history. In the present exemplary embodiment, the thermal history refers to the surface temperature of the recording head 30. While the three pixels immediately preceding the pixel of interest are described to be referred to here, the number of pixels is not limited thereto. The surface temperature of the recording head 30 immediately before a start of recording of the pixel of interest can be estimated by referring to one or more pixels preceding the pixel of interest. A plurality of pixels is desirably referred to in view of the accuracy of the temperature estimation because the temperature varies depending on the history of a plurality of pixels before the pixel of interest. An appropriate number of pixels to be referred to is desirably set by experiment in advance, since the processing load increases if the pixels to be referred to are too many. The surface temperature of the recording head 30 in each of the red development patterns of FIGS. 8A to 8H is measured by experiment in advance, and the correspondence between the red development patterns and the temperatures of the recording head 30 is stored in the ROM 403 of the recording apparatus 40 in advance. The surface temperature of the recording head 30 can thus be estimated from the red development patterns of FIGS. 8A to 8H. Alternatively, the temperatures of the respective image forming layers 14, 16, and 18 of the recording medium 10 may be used as thermal history. As with the recording head 30, the red development patterns of FIGS. 8A to 8H can be associated with the temperatures of the image forming layers 14, 16, and 18 by experiment in advance. The use of the thermal history of the image forming layers 14, 16, and 18 makes the control complex but can improve the control accuracy because color is eventually developed by bringing the image forming layers 14, 16, and 18 to their color developing temperatures. The use of the temperatures of both the recording head 30 and the recording medium 10 maximizes the accuracy because the temperatures of the image forming layers 14, 16, and 18 vary with the surface temperature of the recording head 30 even if the heating pulses are the same. The temperatures of the recording head 30 and the recording medium 10 may be values actually measured during image recording as described above, or simulated values. In the case of using simulated values, parameters for the specific heats, densities, and thermal conductivities of the materials constituting the recording head 30 and the recording medium 10, and the amounts of heat generation, pulse data, and sizes of the heaters included in the recording head 30 are prepared. The simulated values of the foregoing temperatures can be obtained by substituting the prepared parameters into thermal conduction equations and solving the thermal conduction equations for the elapsed time and the conveyance direction. Which of the red development patterns of FIGS. 8A to 8H applies may be simply determined from the pixel values referred to, without the temperature simulation. In other words, pixel value patterns may be regarded as thermal history.

Figure 9:
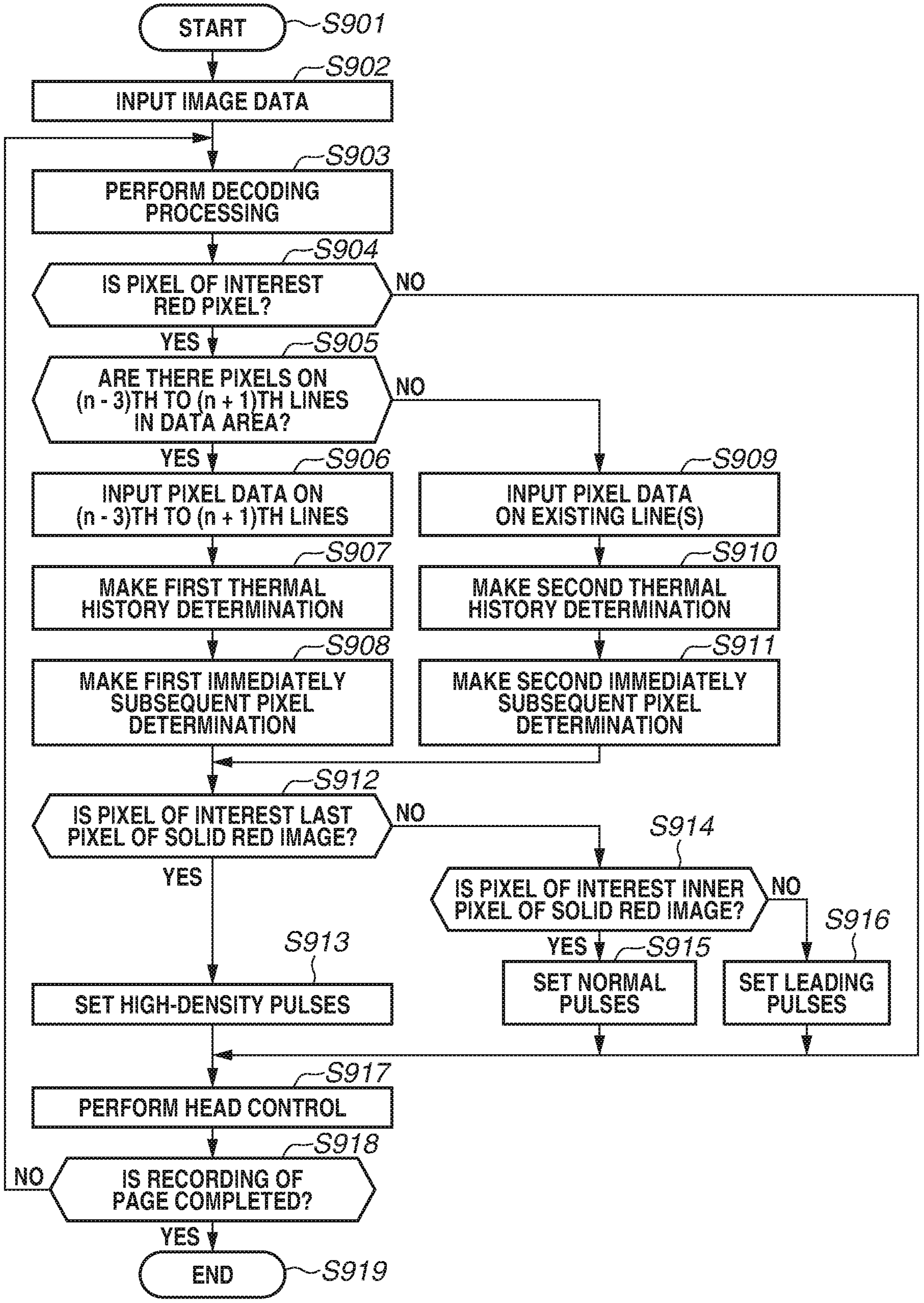
FIG. 9 is a flowchart according to the first exemplary embodiment.

FIG. 9 is a flowchart of the processing for executing a print job in step S616 of FIG. 6. In this processing, heating pulses are generated with reference to the pixels illustrated in FIGS. 8A to 8H, and printing is performed using the generated pulses. The procedure will now be described in order of steps in FIG. 9. The processing of FIG. 9 is to be performed by the CPU 401 based on a program stored in the ROM 403.

In step S901, the CPU 401 starts print processing in executing the print job in step S616 of FIG. 6.

In step S902, the CPU 401 inputs image data included in the print job received in step S614 of FIG. 6.

In step S903, the CPU 401 performs decoding processing if the image data is compressed or encoded.

In step S904, the CPU 401 determines whether a pixel on an nth line, which is the pixel of interest of the image data, is a red pixel. Whether a pixel is a red pixel to develop red can be determined from the R, G, and B values (hereinafter, may be referred to as RGB values) of the input image data. The determination can be made by defining a range in advance such that a pixel having RGB values of R=r0 to r1, G=g0 to g1, and B=b0 to b1 is determined to be red. r0, g0, b0, r1, g1, and b1 can be set based on the intended range for red. If r0=255, g0=0, b0=0, r1=255, g1=0, and b1=0, pixel data with R=255, G=0, and B=0 is determined to be red. Pixel data having other values is determined to not be red.

In step S905, the CPU 401 determines whether there are pixels on (n−3)th to (n+1)th lines illustrated in FIGS. 8A to 8H in the data area, with the pixel marked with ○ on the nth line as the pixel of interest. The pixels on the (n−3)th to (n−1)th lines are the three immediately preceding pixels. The pixel on the (n+1)th line is the immediately subsequent pixel. If the determination is yes (YES in step S905), the processing proceeds to step S906. If the determination is no (NO in step S905), the processing proceeds to step S909.

In step S906, the CPU 401 inputs 8-bit (0 to 255) RGB values that are pixel data on the (n−3)th to (n+1)th lines.

In step S907, the CPU 401 makes a first thermal history determination. In the first thermal history determination, the CPU 401 determines which of the red development patterns of FIGS. 8A to 8H applies to the pixels on the (n−3)th to (n−1)th lines that are the three immediately preceding pixels upstream of the pixel of interest marked with ○ in the conveyance direction. Whether a pixel develops red can be determined from the RGB values of the input pixel data. The determination can be made based on whether the RGB values fall within the red range where R=r0 to r1, G=g0 to g1, and B=b0 to b1. r0, g0, b0, r1, g1, and b1 can be set based on the intended range for red. If r0=255, g0=0, b0=0, r1=255, g1=0, and b1=0, pixel data with R=255, G=0, and B=0 is determined to be red (shaded in FIGS. 8A to 8H). Data having other values is determined to not be red (white pixels in FIGS. 8A to 8H). In such a manner, which of the red development patterns of FIGS. 8A to 8H applies to the three immediately preceding pixels is determined.

Figures 0, 1, 2, 3, 4, 5, 10:
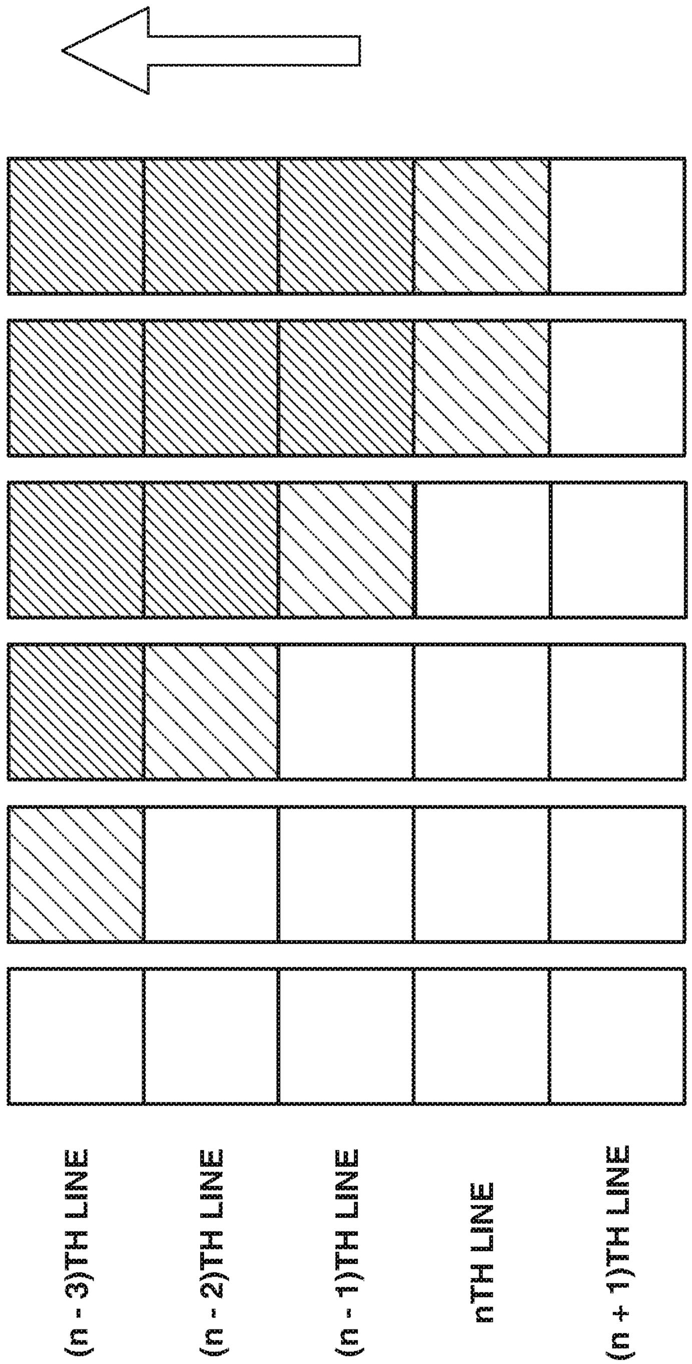

In step S908, the CPU 401 makes a first immediately subsequent pixel determination. In the first immediately subsequent pixel determination, the CPU 401 makes a conditional determination to determine whether the following condition is satisfied: the pixel marked with ● that is the immediately subsequent pixel downstream of the pixel of interest marked with ○ in the conveyance direction be a pixel that practically does not need to develop color of any of the image forming layers 14, 16, and 18 that are the color developing layers of the recording medium 10. At least a white pixel (R=255, G=255, and B=255) that does not develop any color is determined to practically not need to develop color. Whether the image forming layers 14, 16, and 18 practically do not need to develop color can be determined based on whether R=r2 to 255, G=g2 to 255, and B=b2 to 255 are all satisfied. r2, g2, and b2 can be set to color where the effect of the heating pulses of the immediately subsequent pixel on the color development of the preceding pixel of interest is not visually identifiable. For example, with a value approximately ¾ of 255 as a threshold, r2, g2, and b2 may be set so that r2=191, g2=191, and b2=191. The values may be changed color by color since heat propagates differently from one color developing layer to another. If r2=255, g2=255, and b2=255, and the immediately subsequent pixel marked with ● in FIGS. 8A to 8H has the values R=255, G=255, and B=255, the immediately subsequent pixel is determined to practically not need to develop color. The reason for focusing on the pixel immediately subsequent to the pixel of interest will now be described. FIGS. 10-0 to 10-5 are schematic diagrams illustrating color development in the process of recording red pixels in the conveyance direction. FIGS. 10-0 to 10-5 illustrate a total of five pixels, namely, a pixel on the (n−3)th line to a pixel on the (n+1)th line in the conveyance direction. FIG. 10-0 illustrates five pixels that are all unrecorded white pixels. FIG. 10-1 illustrates the result of application of R pulses of FIG. 7 to the pixel on the (n−3)th line with thin shades. FIG. 10-2 illustrates the result of application of the R pulses of FIG. 7 to the pixels on the (n−3)th and (n−2)th lines. The pixel on the (n−3)th line develops darker color than the pixel on the (n−2)th line does, since the heat due to the pulses applied to the pixel on the (n−2)th line propagates to intensify the color development of the pixel on the (n−3)th line which is the immediately preceding pixel. The darker color development is illustrated with thick shades. A similar configuration applies to the subsequent FIGS. 10-3 and 10-4. FIG. 10-3 illustrates the result of application of the R pulses of FIG. 7 to the pixels on the (n−3)th to (n−1)th lines with shades. FIG. 10-4 illustrates the result of application of the R pulses of FIG. 7 to the pixels on the (n−3)th to nth lines with shades. FIGS. 10-3 and 10-4 illustrate the intensified color development of the pixels on the (n−2)th and (n−1)th lines that are the respective immediately preceding pixels with thick shades. In continuously applying the R pulses to develop red, the color development of the immediately preceding pixel can thus be intensified and increased in density by the heating of the pixel (pixel of interest) subsequent to the immediately preceding pixel. As illustrated in FIG. 7, the R pulses concentrate on the first half of the pulse range. If the R pulses are applied to the pixel of interest in the recording medium 10, the image forming layers 14 and 16 of the pixel of interest thus increase in temperature near the border with the immediately preceding pixel. The heat propagates to the immediately preceding pixel near the temperature-increased location as well since heat propagates to surroundings where temperature is low. As a result, the image forming layers 14 and 16 in the immediately preceding pixel of the recording medium 10 reach their color developing temperatures and the development density of the immediately preceding pixel increases. The distance from the temperature-increased location of the pixel to which the R pulses are applied to the immediately preceding pixel is smaller than to the immediately subsequent pixel. When the R pulses are applied to the pixel of interest, the heat therefore propagates less from the pixel of interest to the immediately subsequent pixel than to the immediately preceding pixel. Consequently, if the R pulses of FIG. 7 are applied to preceding and subsequent two consecutive pixels in the conveyance direction, the density of the pixel recorded later is lower than that of the pixel recorder before.

In other words, immediately after the application of the R pulses to the pixel of interest during printing of consecutive red pixels, the pixel of interest has a lower density than that of the immediately preceding pixel. The last pixel of a solid red image thus has a lower density than that of the inner pixels of the solid red image. For such a reason, the present exemplary embodiment focuses on the pixel immediately after the pixel of interest in the heating pulse control.

In step S909, the CPU 401 inputs 8-bit (0 to 255) RGB values that are pixel data on existing lines among the (n−3)th to (n+1)th lines illustrated in FIGS. 8A to 8H.

In step S910, the CPU 401 makes a second thermal history determination. In the second thermal history determination, the CPU 401 determines which of the red development patterns of FIGS. 8A to 8H applies to an existing one or ones of the pixels on the (n−3)th to (n−1)th lines that are the three immediately preceding pixels upstream of the pixel of interest marked with ○ in the conveyance direction. As in step S907, whether a pixel develops red can be determined based on the RGB values of the input pixel data. If the pixel data on all the (n−3)th to (n−1)th lines is input, which of the red development patterns of FIGS. 8A to 8H applies to the three immediately preceding pixels is determined as in step S907. If pixel data on only the (n−2)th and (n−1)th lines is input, the CPU 401 determines the red development pattern with reference to the pixel data on the (n−2)th and (n−1)th lines in the red development patterns of FIGS. 8B, 8D, 8F, and 8H. If pixel data on only the (n−1)th line is input, the CPU 401 determines the red development pattern with reference to the pixel data on the (n−1)th line in the red development patterns of FIGS. 8D and 8H. If pixel data even on the (n−1)th line is not input, the CPU 401 determines that the red development pattern of FIG. 8H applies.

In step S911, the CPU 401 makes a second immediately subsequent pixel determination. In the second immediately subsequent pixel determination, if pixel data on the (n+1)th line is input, the CPU 401 determines, as in step S908, whether the pixel marked with ● that is the pixel immediately subsequent to the pixel of interest in the conveyance direction is a pixel that practically does not need to develop the color of any of the image forming layers 14, 16, and 18 that are the color developing layers of the recording medium 10. If pixel data on the (n+1)th line is not input, the CPU 401 determines that the immediately subsequent pixel practically does not need to develop color.

In step S912, the CPU 401 determines whether the pixel of interest marked with ○ is likely to be the last pixel of a solid red image. If one of the red development patterns of FIGS. 8A to 8D is determined to apply in step S907 and the immediately subsequent pixel is determined to practically not need to develop color in step S908 (YES in step S912), the processing proceeds to step S913. If not (NO in step S912), the processing proceeds to step S914.

In step S913, the CPU 401 sets high-density pulses for the pixel of interest marked with ○. By using a three-dimensional lookup table (3D_LUT), the high-density pulses can be set as follows:

high-density pulses=3D_LUT[R][G][B][0].

Figures 0A, 0B, 1, 2, 11:
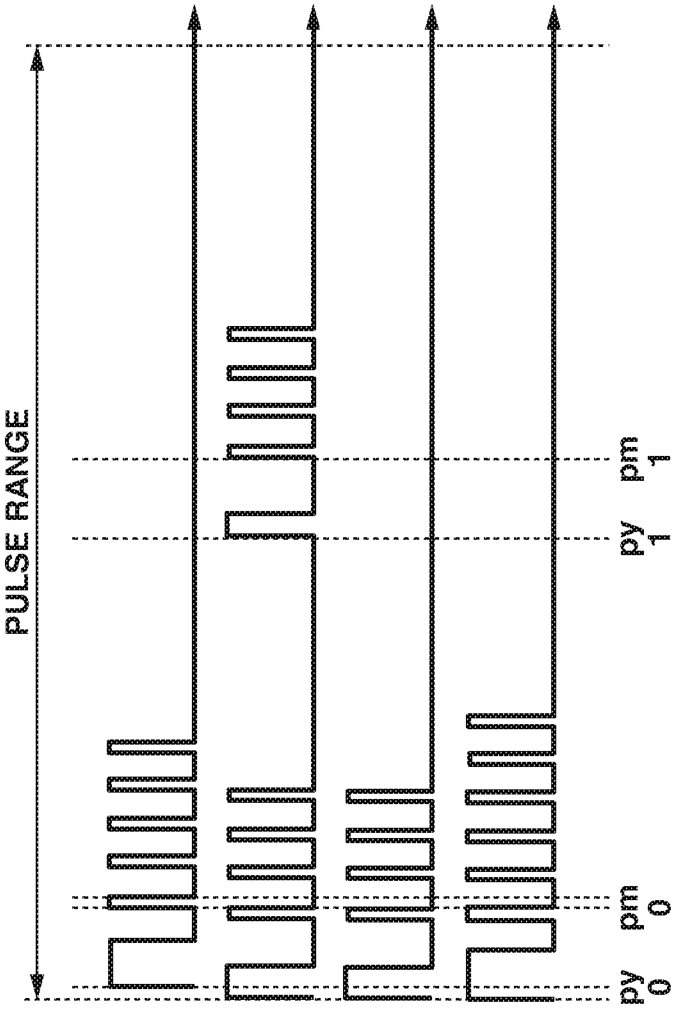

The 3D_LUT includes 256×256×256×3 pieces of data. As illustrated in FIG. 7, each piece of data includes the timing, widths, and numbers of heating pulses to be applied depending on the combination of the R, G, and B values. High-density pulses are set with an emphasis on the color development of the last pixel of a solid image in a specific color. FIGS. 11-0A and 11-0B illustrate two types of high-density pulses, FIG. 11-1 normal pulses, and FIG. 11-2 leading pulses for specific color red where R=255, G=0, and B=0. The horizontal axes are time axes. In step S913, the high-density pulses illustrated in FIG. 11-0A or 11-0B are set. Normal pulses will be described below in conjunction with step S915. Leading pulses will be described below in conjunction with step S916. The high-density pulses of FIG. 11-0A include a Y development pulse to be applied at timing py0. The Y development pulse has a pulse width greater than a normal pulse width in FIG. 11-1. The Y development pulse of FIG. 11-0A can thus apply higher thermal energy to the pixel of interest. If timing py0 in FIG. 11-0A is the same as in FIG. 11-1, the larger pulse width at timing py0 increases the heat to propagate to the immediately preceding pixel. Such a pulse not only increases the density of the pixel of interest but increases the density of the immediately preceding pixel as well, and causes a density difference between the pixels. The delayed timing py0 in FIG. 11-0A is intended to reduce the heat propagating to the immediately preceding pixel and reduce the density difference between the pixel of interest and the immediately preceding pixel. Moreover, in FIG. 11-0A, the number of M development pulses applied at timing pm0 is greater than that of M development pulses in the normal pulses of FIG. 11-1. As a result, the thermal energy for the image forming layer 16 that develops M can be increased. Another type of high-density pulses illustrated in FIG. 11-0B will now be described. The Y development pulse and the M development pulses applied at timing py0 and timing pm0 in FIG. 11-0B are the same as those in the normal pulses of FIG. 11-1. A difference is that a Y development pulse and M development pulses are added at timing py1 and pm1 in FIG. 11-0B. The duration from the pulse applied at the beginning of FIG. 11-0B (the pulse applied at timing py0) to the pulse last applied (the last of the pulses applied at timing pm1) is longer than the normal duration from the pulse applied at the beginning in FIG. 11-1 to the pulse last applied. The increased thermal energy can increase the density. By timing py1, some time has elapsed since the timing at the border with the immediately preceding pixel. Thus, the heat from the pulse added at this timing py1 therefore does not propagate as much as to intensify the color development of the immediately preceding pixel. Timing py1 is also away from the border with the immediately subsequent pixel, and thus does not contribute to the color development of the immediately subsequent pixel, either. Since the high-density pulses increase the thermal energy for the last pixel of a solid red image while maintaining the thermal energy propagating to the immediately preceding pixel equivalent to that of the normal pulses, a density difference between the last pixel and the inner pixels of the solid red image can be reduced. High-density pulses refer to pulses of which thermal energy is increased at least either by widening the pulse widths or narrowing the pulse intervals to increase a duty ratio or by increasing the number of pulses compared to normal pulses. As described with reference to FIG. 10, the specific color to set high-density pulses for may be one where the application of pulses to preceding and subsequent, two consecutive pulses in the conveyance direction increases the density of the preceding pixel. High-density pulses for the specific color can be set at the table position of the R, G, and B values corresponding to the specific color. Normal pulses for non-specific colors can be set at the table positions of the R, G, and B values corresponding to those colors.

In step S914, the CPU 401 determines whether the pixel of interest is an inner pixel of a solid red image. If one of the red development patterns of FIGS. 8A to 8D where the thermal history is higher than or equal to a predetermined value in step S907 and the immediately subsequent pixel is determined to develop color in step S908 (YES in step S914), the processing proceeds to step S915. If the thermal history is determined to not be higher than or equal to the predetermined value (NO in step S914), the processing proceeds to step S916.

In step S915, the CPU 401 sets normal pulses for the pixel of interest marked with ○. Using the 3D_LUT, the CPU 401 can set the normal pulses as follows:

normal pulses=3D_LUT[R][G][B][1].

Normal pulses are set to be suitable for the color development of an inner pixel of a solid image in each color. In this step S915, the CPU 401 sets the normal pulses illustrated in FIG. 11-1 for the red pixel. Normal pulses are reduced in pulse width or in number compared to high-density pulses. Pulse intervals may be widened. In such a manner, the thermal energy to be applied to the recording medium 10 is made lower than that of high-density pulses. As described in conjunction with FIGS. 10-0 to 10-5, the application of the red normal pulses to the pixel of interest increases the density of the immediately preceding red pixel.

In step S916, the CPU 401 sets leading pulses for the pixel of interest marked with ○. Using the 3D_LUT, the CPU 401 can set the leading pulses as follows:

leading pulses=3D_LUT[R][G][B][2].

In this step S916, the leading pulses illustrated in FIG. 11-2 are set for the red pixel. Leading pulses are increased in pulse width or in number compared to high-density pulses. In such a manner, the thermal energy to be applied to the recording medium 10 is desirably made higher than that of high-density pulses. In step S916, the pixel of interest is likely to be located at the leading edge of an image, and the heat propagation from the immediately preceding pixel is lower than to an inner pixel of a solid image. The color development at the leading edge of the image can therefore be improved by applying higher thermal energy to the recording medium 10 than that of high-density pulses.

In step S917, the CPU 401 performs head control. The CPU 401 applies the pulses set in step S913, S915, or S916 to the recording head 30 to cause the recording medium 10 to develop color.

In step S918, the CPU 401 checks whether the recording of this page is completed. If no (NO in step S918), the processing returns to step S903 to continue recording this page with the next pixel (pixel on the (n+1)th line) as the pixel of interest. If the determination in step S918 is yes (YES in step S918), the processing proceeds to step S919. In step S919, the CPU 401 ends the print processing.

As illustrated in FIG. 7, the thermal energy of the pulses varies color by color. The thermal history thus varies depending on the color of the color development patterns in FIGS. 8A to 8H. The thermal history of red described above falls within a predetermined range.

According to the method described above, if the thermal history falls within a predetermined value range and the immediately subsequent pixel practically does not need to develop color, pulses having high thermal energy are applied to the red pixel of interest as compared to when the thermal history is the same and the immediately subsequent pixel develops color. As illustrated in FIGS. 11-0A to 11-2, the thermal energy can be increased by increasing the pulse widths or reducing the pulse intervals, that is, increasing the duty ratio of the pulses. The thermal energy can also be increased by increasing the number of pulses. The application of high-density pulses having the increased thermal energy to the last pixel of a solid red image enables recording with a reduced density difference from the inner pixels of the solid red image.

Next, a method for finely controlling heating pulses based on thermal history will be described. As the number of pixels to which the same heating pulses are applied increases in the conveyance direction, the temperature of the recording head 30 increases. This increases the thermal energy propagating from the recording head 30 to the recording medium 10, and the temperature resulting from the applied heating pulses increases as well. If the temperature increases further, an image forming layer not intended to develop color can exceed its color developing temperature and develop color. In view of this, reduction of density variations between pixels through control of heating pulses based on thermal history will be described. Note that density variations between the inner pixels of a solid red image can be reduced by controlling the heating pulses based on the thermal history. By contrast, the last pixel has a lower density than that of the inner pixels since there is no heat propagation to the last pixel from an immediately subsequent pixel. The thermal history control and the use of high-density pulses for the last pixel are therefore desirably implemented in combination as described below.

FIGS. 12A to 12D illustrate examples of fine control of high-density pulses based on thermal history. The horizontal axes are time axes. This control is performed in step S913. The following description deals with a case where the red development pattern is determined to be one of those of FIGS. 8A to 8D in step S907 or S910 and the immediately subsequent pixel is determined to practically not need to develop color in step S908 or S911. In step S912, the CPU 401 determines whether the foregoing two conditions are satisfied, and determines that the pixel of interest marked with ○ is the last pixel of a solid red image. In step S913, the CPU 401 sets the heating pulses of one of FIGS. 12A to 12D corresponding to the red development patterns of FIGS. 8A to 8D, respectively. The CPU 401 can set the heating pulses using a 3D_LUT:

high-density pulses (a)=3D_LUT[R][G][B][0][0],
high-density pulses (b)=3D_LUT[R][G][B][0][1],
high-density pulses (c)=3D_LUT[R][G][B][0][2], and
high-density pulses (d)=3D_LUT[R][G][B][0][3].

Figures 12A, 12B, 12C, 12D:
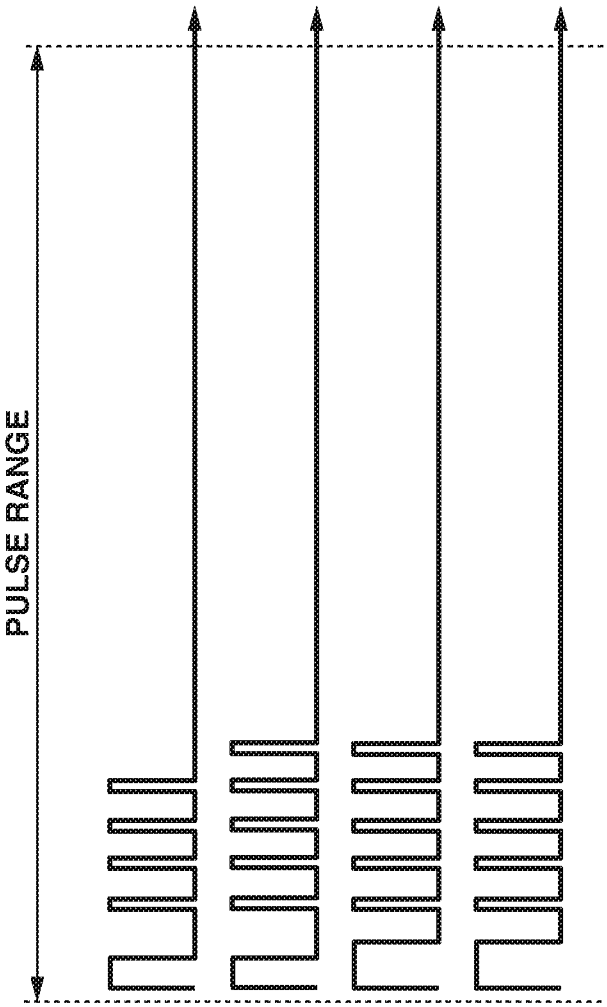
FIGS. 12A to 12D are diagrams illustrating high-density pulse control based on thermal history according to the first exemplary embodiment.

The foregoing 3D_LUT includes 256×256×256×3×4 pieces of data. The heating pulses of FIG. 12D are the same as the high-density pulses of FIG. 11-0A. If the temperature estimated from the thermal history is high, the CPU 401 sets heating pulses having lower thermal energy than in FIG. 12D, such as those of FIGS. 12A and 12B. The heating pulses of FIG. 12C are the same as those of FIG. 12D since the difference in the thermal history immediately before the pixel of interest between FIGS. 8C and 8D is sufficiently small. The high-density pulses of FIGS. 12A to 12D provide higher thermal energy than that of the normal pulses of FIGS. 13A to 13D, respectively.

FIGS. 13A to 13D illustrate examples where normal pulses are finely controlled based on thermal history. The horizontal axes are time axes. This control is performed in step S915. The following description deals with a case where one of the red development patterns of FIGS. 8A to 8D is determined to apply in step S907 or S910 and the immediately subsequent pixel is determined to develop color in step S908 or S911. In step S914, the CPU 401 determines whether the foregoing two conditions are satisfied, and determines that the pixel of interest marked with ○ is an inner pixel of a solid red image. In step S915, the CPU 401 sets the heating pulses of one of FIGS. 13A to 13D corresponding to the red development patterns of FIGS. 8A to 8D, respectively:

normal pulses (a)=3D_LUT[R][G][B][1][0],
normal pulses (b)=3D_LUT[R][G][B][1][1],
normal pulses (c)=3D_LUT[R][G][B][1][2], and
normal pulses (d)=3D_LUT[R][G][B][1][3].

Figures 13A, 13B, 13C, 13D:
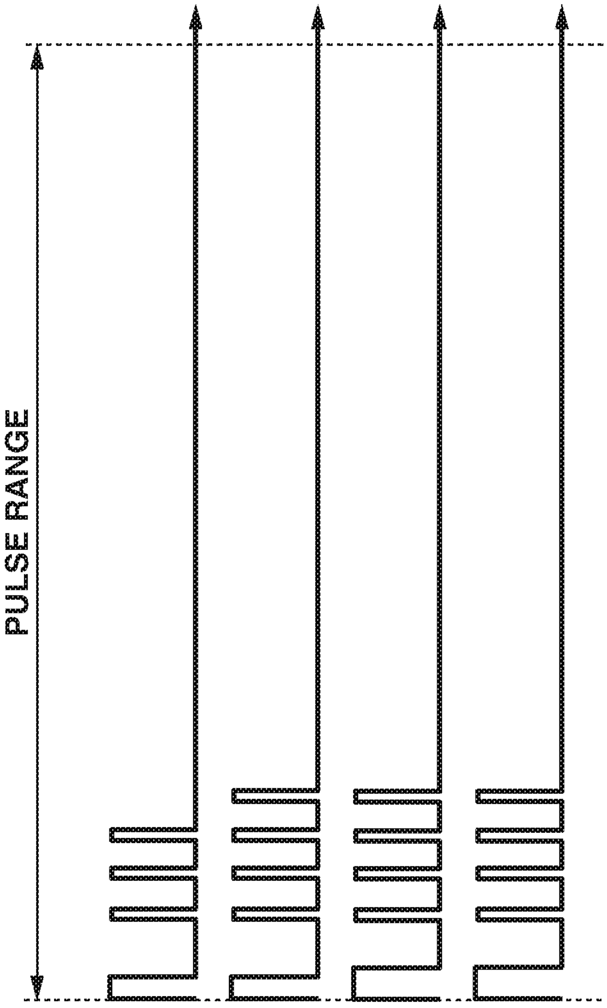
FIGS. 13A to 13D are diagrams illustrating normal pulse control based on the thermal history according to the first exemplary embodiment.

The heating pulses of FIG. 13D are the same as the normal pulses of FIG. 11-1. If the temperature estimated from the thermal history is high, the CPU 401 sets heating pulses having lower thermal energy than in FIG. 13D, such as those of FIGS. 13A and 13B. The heating pulses of FIG. 13C are the same as those of FIG. 13D since the difference in the thermal history immediately before the pixel of interest between FIGS. 8C and 8D is sufficiently small. The normal pulses of FIGS. 13A to 13D provide lower thermal energy than that of the high-density pulses of FIGS. 12A to 12D, respectively.

Even in finely controlling pulses based on thermal history, the CPU 401 can set leading pulses in step S916 by storing the pulse data of FIG. 11-2 in the 3D_LUT. In the cases of the red development patterns of FIGS. 8E to 8H, the same leading pulses as those of FIG. 11-2 are applied:

leading pulses (a)=3D_LUT[R][G][B][2][0],
leading pulses (b)=3D_LUT[R][G][B][2][1],
leading pulses (c)=3D_LUT[R][G][B][2][2], and
leading pulses (d)=3D_LUT[R][G][B][2][3].

The thermal history-based normal pulse control described in conjunction with FIGS. 13A to 13D can reduce density variations in the inner pixels of a solid red image due to a temperature rise of the recording head 30. Moreover, the thermal history-based high-density pulse control described with reference to FIGS. 12A to 12D enables recording with a reduced density difference between the last pixel of a solid red image and the inner pixels of the solid red image.

A second exemplary embodiment will be described below. In the first exemplary embodiment, the high-density pulses are described to be implemented by increasing at least either the duty ratio or the number of times of application of heating pulses. In the present exemplary embodiment, an example where high-density pulses are implemented by reducing a blank time (described below) where no pulse is applied between the pulses of the last pixel and those of the immediately preceding pixel compared to that between the normal pulses of the inner pixels will be described.

Figures 0A, 0B, 1, 14:
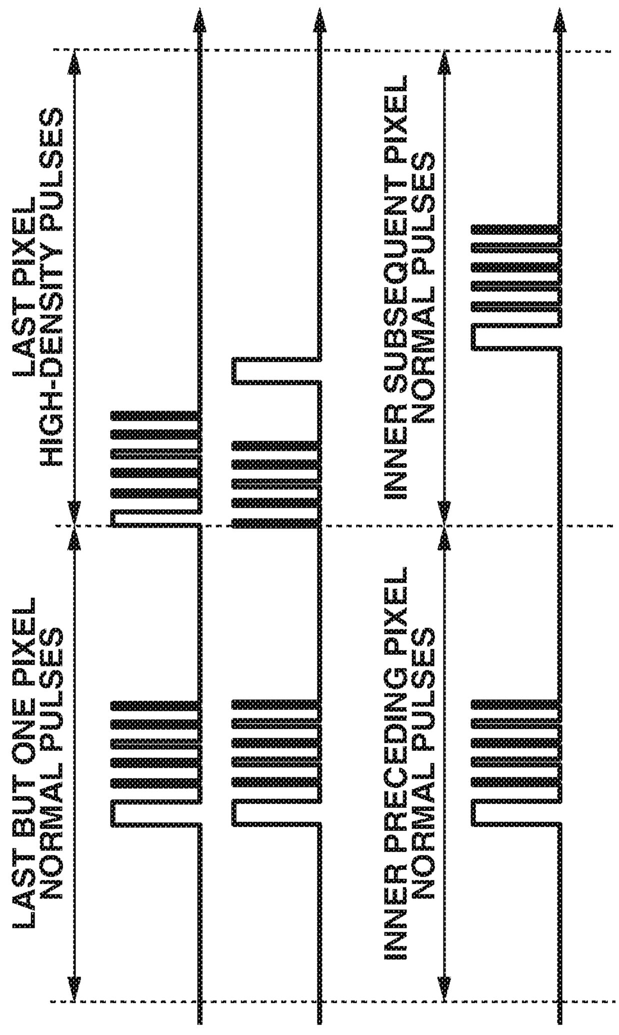

FIGS. 14-0A to 14-1 illustrate pulses with different blank times in a pulse range. The horizontal axes are time axes. FIGS. 14-0A and 14-0B illustrate the normal pulses of the pixel immediately preceding the last pixel of a solid red image and the high-density pulses of the last pixel. FIG. 14-1 illustrates the normal pulses of preceding and subsequent two pixels in an inner area of the solid red image. The following description will be provided on the assumption that the normal pulses in FIGS. 14-0A, 14-0B, and 14-1 are the same. The normal pulses are implemented by locating heating pulses at the center of each pixel, with blank times in front and behind. A sufficient blank time is thereby left between the preceding and subsequent pixels. The high-density pulses of FIGS. 14-0A and 14-0B are characterized by having a short blank time between the preceding and subsequent pixels compared to the normal pulses of FIG. 14-1. In blank times, the recording head 30 and the recording medium 10 drop in temperature. When the high-density pulses of FIG. 14-0A or 14-0B with the short blank time are applied to the last pixel, the temperature drop in each pixel is smaller than when the normal pulses are applied. As a result, the last pixel can reach the temperature higher than or equal to the color developing temperatures of the image forming layers or take time to reach or exceed the color developing temperatures as in the inner pixels of the image without heat propagation from an immediately subsequent pixel. The Y development pulse that is the first pulse of the last pixel in FIG. 14-0A is made shorter than that of the last but one pixel for the following reason. The short blank time between the preceding and subsequent pixels facilitates the propagation of the thermal energy of the last pixel to the immediately preceding pixel. The Y development pulse is therefore reduced in width so that the heat propagation to the immediately preceding pixel becomes equivalent to that from the normal pulses of FIG. 14-1. The last but one pixel thus has a density equivalent to that of the inner pixel of FIG. 14-1. In FIG. 14-0B, the high-density pulses are arranged so that the M development pulses of the last pixel are applied first. This can prevent excessive heat propagation to the immediately preceding pixel despite the short blank time from the immediately preceding pixel, since the M development pulses do not produce as high a temperature as the Y development pulse does.

A similar procedure to that described in conjunction with FIG. 9 according to the first exemplary embodiment can be used to perform printing with the heating pulse control. Differences will now be described.

In step S913, the CPU 401 sets the pulse data of FIG. 14-0A or 14-0B in the 3D_LUT:

high-density pulses=3D_LUT[R][G][B][0], instead of the pulse data of FIG. 11-0A or 11-0B. The CPU 401 can thereby set the high-density pulses of FIG. 14-0A or 14-0B for the red pixel of interest that is determined to be the last pixel of a solid red image in step S912.

In step S915, the CPU 401 sets the pulse data of FIG. 14-1 in the 3D_LUT:

normal pulses=3D_LUT[R][G][B][1], instead of the pulse data of FIG. 11-1. The CPU 401 can thereby set the normal pulses of FIG. 14-1 for the red pixel of interest that is determined to be an inner pixel of a solid red image in step S914.

According to the method described above, if the thermal history falls within a predetermined value range and the immediately subsequent pixel practically does not need to develop color, high-density pulses having a short blank time from the immediately preceding pixel are applied to the red pixel of interest as compared to when the thermal history is the same and the immediately subsequent pixel develops color. The application of the high-density pulses to the last pixel of a solid red image can thus reduce a drop in the density of the last pixel of the image and enable recording with a reduced density difference from the inner pixels of the solid red image.

Other Exemplary Embodiments

The first exemplary embodiment is described in conjunction with red expressed by R=255, G=0, and B=0. However, r0, g0, b0, r1, g1, and b1 may be set to other numerical values. In other words, the first exemplary embodiment can be applied to any color where the last pixel is likely to be insufficiently developed due to insufficient heat propagation.

For example, blue expressed by R=0, G=0, and B=255 is applicable. The numerical values are desirably set to color where the temperature immediately before the pixel of interest is estimated to fall within a predetermined range and the immediately subsequent pixel can be determined to practically not need to develop color from the thermal history, and the application of high-density pulses to the last pixel of the solid image can reduce a density difference between the last pixel and inner pixels of the solid image.

Figure 15:
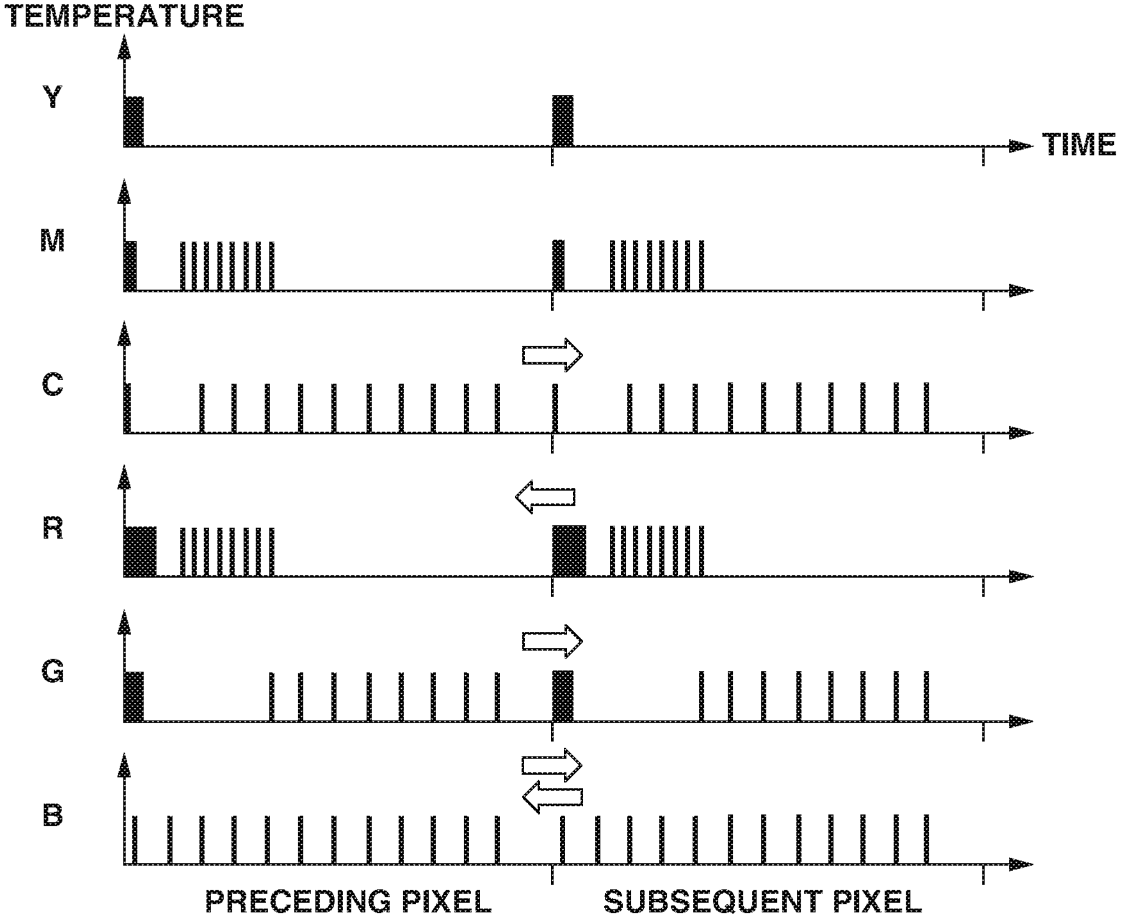
FIG. 15 is a diagram illustrating thermal effects of color pulses on preceding and subsequent pixels.

In the first and second exemplary embodiments, the high-density pulses and normal pulses for red are described to be controlled. The reason for focusing on red will now be described with reference to FIG. 15. FIG. 15 illustrates the heating pulses of preceding and subsequent pixels in the conveyance direction in respective solid images of six hues or colors Y, M, C, R, G, and B. The arrows in FIG. 15 indicate the directions in which the heat propagation between the preceding and subsequent pixels is high. The absence of an arrow indicates low heat propagation between the preceding and subsequent pixels. In FIG. 15, the heat propagation is regarded as high if the thermal energy of the pulses in one pixel affects the color development by the pulses in the other. As illustrated in FIG. 15, the subsequent R pulses affect the color development by the preceding R pulses. For such a reason, the first and second exemplary embodiments have focused on red. As illustrated in FIG. 15, the preceding and subsequent blue pulses affect each other's color development. If the effect of the subsequent pulses is higher than that of the preceding pulses, high-density pulses can be applied to the last pixel of the solid blue image and normal pulses to the inner pixels according to the first and second exemplary embodiments. With r0=0, g0=0, b0=255, r1=0, g1=0, and b1=255, color expressed by R=0, G=0, and G=255 can be determined to be blue. The processing procedure is similar to that of FIG. 9. The B pulses illustrated in FIG. 7 can be used as the normal pulses. The high-density pulses can be obtained by adding B pulses having the same pulse width and pulse interval as in FIG. 7 to the blank area after the B pulses of FIG. 7. The number of B pulses to be added is adjusted so that a density difference from the inner pixels can be reduced.

According to the foregoing exemplary embodiments, a drop in the development density of pixels with which a high-density image is recorded can be reduced.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-025903, filed Feb. 22, 2022, which is hereby incorporated by reference herein in its entirety.

What is claimed is:

1. A recording apparatus comprising:

a recording head including a plurality of heating elements arranged in a predetermined direction, the recording head being configured to heat a sheet-like recording medium based on image data to form an image on the recording medium by causing a desired color developing layer to develop color among a plurality of color developing layers stacked in the recording medium, the plurality of color developing layers corresponding to a plurality of colors and being configured to develop color in response to heating;

a first conditional determination unit configured to determine whether a first condition is satisfied, the first condition being that an immediately subsequent pixel that is located at a same position as a pixel of interest in the predetermined direction and is to be recorded next to the pixel of interest be either a pixel that develops color of which an effect on color development of the pixel of interest is not visually identifiable or a pixel that does not develop color of any of the color developing layers of the recording medium; and a pulse control unit configured to control a pulse to be applied to the recording head in forming the pixel of interest based on a result of determination made by the first conditional determination unit, wherein the pulse control unit is configured to control, in a case where the pixel of interest of the image data has a predetermined value and the first condition is satisfied, the pulse to increase thermal energy for the recording head to apply to the recording medium in forming the pixel of interest as compared to a case where the pixel of interest of the image data has the predetermined value and the first condition is not satisfied.

2. The recording apparatus according to claim 1, wherein the pulse control unit is configured to control, in increasing the thermal energy for the recording head to apply to the recording medium, the pulse to make at least either a heating temperature or a heating time of the recording head higher or longer than in not increasing the thermal energy for the recording head to apply to the recording medium.

3. The recording apparatus according to claim 1, wherein the pulse control unit is configured to make, in increasing the thermal energy for the recording head to apply to the recording medium, an interval between a pulse to be applied to an immediately preceding pixel that is located at the same position as the pixel of interest in the predetermined direction and is to be recorded immediately before the pixel of interest and the pulse to be applied to the pixel of interest longer than in not increasing the thermal energy for the recording head to apply to the recording medium.

4. The recording apparatus according to claim 1, wherein the pulse control unit is configured to make, in increasing the thermal energy for the recording head to apply to the recording medium, a duration from a pulse to be applied first to the pixel of interest to a pulse to be applied last to the pixel of interest longer than in not increasing the thermal energy for the recording head to apply to the recording medium.

5. The recording apparatus according to claim 1, further comprising a second conditional determination unit configured to determine whether a second condition is satisfied, the second condition indicating that thermal history is higher than or equal to a predetermined value in forming a preceding pixel that is located at the same position as the pixel of interest in the predetermined direction and is to be recorded before the pixel of interest, the thermal history being a temperature of the recording head or each of the color developing layers of the recording medium, wherein the pulse control unit is configured to control, in a case where the pixel of interest of the image data has the predetermined value, the first condition is satisfied, and the second condition is satisfied, the pulse to increase the thermal energy for the recording head to apply to the recording medium in forming the pixel of interest as compared to a case where the pixel of interest of the image data has the predetermined value, the first condition is satisfied, and the second condition is not satisfied.

6. The recording apparatus according to claim 5, wherein the pulse control unit is configured to control, in a case where the second condition is satisfied and the temperature indicated by the thermal history is a first temperature, the pulse to increase the thermal energy for the recording head to apply to the recording medium as compared to a case where the second condition is satisfied and the temperature indicated by the thermal history is a second temperature higher than the first temperature.

7. The recording apparatus according to claim 5, wherein the second conditional determination unit is configured to determine whether the second condition is satisfied based on the thermal history in forming a plurality of preceding pixels that is located at the same position as the pixel of interest in the predetermined direction and is to be recorded before the pixel of interest.

8. The recording apparatus according to claim 1, wherein the pulse control unit is configured to control, in a case where the first condition is not satisfied, the pixel of interest of the image data has the predetermined value, and an immediately preceding pixel, of the image data, that is located at the same position as the pixel of interest in the predetermined direction and is to be recorded immediately before the pixel of interest has a value indicating a pixel that does not develop the color of any of the color developing layers, the pulse to increase the thermal energy for the recording head to apply to the recording medium in forming the pixel of interest as compared to a case where the first condition is not satisfied and the pixel of interest and the immediately preceding pixel of the image data have the predetermined value.

9. The recording apparatus according to claim 1, wherein the pixel of interest is a pixel that develops red.

10. The recording apparatus according to claim 1, wherein the pixel of interest is a pixel that develops blue.

11. A recording apparatus comprising a recording head including a plurality of heating elements arranged in a predetermined direction, the recording head being configured to heat a sheet-like recording medium based on image data to form an image on the recording medium by causing a desired color developing layer to develop color among a plurality of color developing layers stacked in the recording medium, the plurality of color developing layers corresponding to a plurality of colors and being configured to develop color in response to heating, wherein, in a case of the image data having a pixel of interest to be caused to develop red and an immediately subsequent pixel to be not caused to develop color of any of the color developing layers of the recording medium, thermal energy for the recording head to apply in forming the pixel of interest is increased as compared to a case of the image data having the pixel of interest to be caused to develop red and the immediately subsequent pixel to be caused to develop red, the immediately subsequent pixel being located at a same position as the pixel of interest in the predetermined direction and being to be recorded next to the pixel of interest.

12. The recording apparatus according to claim 11, wherein, in a case of the image data having the pixel of interest to be caused to develop red, the immediately subsequent pixel to be caused to develop red, and an immediately preceding pixel to be not caused to develop color of any of the color developing layers of the recording medium, the thermal energy for the recording head to apply in forming the pixel of interest is increased as compared to a case of the image data having the pixel of interest to be caused to develop red, the immediately subsequent pixel to be caused to develop red, and the immediately preceding pixel to be caused to develop red, the immediately preceding pixel being at the same position as the pixel of interest in the predetermined direction and being to be recorded immediately before the pixel of interest.

13. The recording apparatus according to claim 12, wherein, in increasing the thermal energy for the recording head to apply, an interval between a pulse to be applied to the immediately preceding pixel and a pulse to be applied to the pixel of interest is made longer in the case of the image data having the pixel of interest to be caused to develop red and the immediately subsequent pixel to be not caused to develop the color of any of the color developing layers than in a case of the image data having the pixel of interest to be caused to develop red, the immediately subsequent pixel to be caused to develop red, and the immediately preceding pixel to be not caused to develop the color of any of the color developing layers.

14. The recording apparatus according to claim 12, wherein, in increasing the thermal energy for the recording head to apply, an interval between a pulse to be applied to the pixel of interest and a pulse to be applied to the immediately subsequent pixel is made shorter in the case of the image data having the pixel of interest to be caused to develop red and the immediately subsequent pixel to be not caused to develop the color of any of the color developing layers than in a case of the image data having the pixel of interest to be caused to develop red, the immediately subsequent pixel to be caused to develop red, and the immediately preceding pixel to be not caused to develop the color of any of the color developing layers.

15. The recording apparatus according to claim 12, wherein, in increasing the thermal energy for the recording head to apply, a duration from a pulse to be applied first to the pixel of interest to a pulse to be applied last to the pixel of interest is made longer in the case of the image data having the pixel of interest to be caused to develop red and the immediately subsequent pixel to be not caused to develop the color of any of the color developing layers than in a case of the image data having the pixel of interest to be caused to develop red, the immediately subsequent pixel to be caused to develop red, and the immediately preceding pixel to be not caused to develop the color of any of the color developing layers.

16. A recording method comprising:

heating a sheet-like recording medium based on image data using a recording head to form an image on the recording medium by causing a desired color developing layer to develop color among a plurality of color developing layers stacked in the recording medium, the plurality of color developing layers corresponding to a plurality of colors and being configured to develop color in response to heating, the recording head including a plurality of heating elements arranged in a predetermined direction;

determining whether a condition is satisfied, the condition being that an immediately subsequent pixel that is located at a same position as a pixel of interest in the predetermined direction and is to be recorded next to the pixel of interest be either a pixel that develops color of which an effect on color development of the pixel of interest is not visually identifiable or a pixel that does not develop color of any of the color developing layers of the recording medium; and generating a pulse to be applied to the recording head in forming the pixel of interest based on a result of the determining, wherein, in a case where the pixel of interest of the image data has a predetermined value and the condition is satisfied, the pulse is generated to increase thermal energy for the recording head to apply to the recording medium in forming the pixel of interest as compared to a case where the pixel of interest of the image data has the predetermined value and the condition is not satisfied, and wherein the recording head is heated based on the generated pulse.

17. A recording method comprising heating a sheet-like recording medium based on image data using a recording head to form an image on the recording medium by causing a desired color developing layer to develop color among a plurality of color developing layers stacked in the recording medium, the plurality of color developing layers corresponding to a plurality of colors and being configured to develop color in response to heating, the recording head including a plurality of heating elements arranged in a predetermined direction, wherein, in a case of the image data having a pixel of interest to be caused to develop red and an immediately subsequent pixel to be not caused to develop color of any of the color developing layers of the recording medium, thermal energy for the recording head to apply in forming the pixel of interest is increased as compared to a case of the image data having the pixel of interest to be caused to develop red and the immediately subsequent pixel to be caused to develop red, the immediately subsequent pixel being located at a same position as the pixel of interest is in the predetermined direction and being to be recorded next to the pixel of interest.

* * * * *